(12) United States Patent
Sugaya

(10) Patent No.: US 8,793,703 B2
(45) Date of Patent: Jul. 29, 2014

(54) MOBILE TERMINAL, METHOD AND PROGRAM FOR PROVIDING A VIRTUAL SETUP SCREEN

(71) Applicant: OPTiM Corporation, Saga (JP)

(72) Inventor: Shunji Sugaya, Tokyo (JP)

(73) Assignee: Optim Corporation, Saga-Shi (JP)

( * ) Notice: Subject to any disclaimer, the term of this patent is extended or adjusted under 35 U.S.C. 154(b) by 2 days.

(21) Appl. No.: 13/762,596

(22) Filed: Feb. 8, 2013

(65) Prior Publication Data

US 2014/0181840 A1    Jun. 26, 2014

(30) Foreign Application Priority Data

Dec. 21, 2012    (JP) ................................. 2012-280165

(51) Int. Cl.
*G06F 3/00*     (2006.01)
*G06F 9/44*     (2006.01)
*G06F 9/46*     (2006.01)
*G06F 13/00*    (2006.01)
*G06F 9/54*     (2006.01)

(52) U.S. Cl.
CPC ....................................... *G06F 9/54* (2013.01)
USPC ........................................................ 719/313

(58) Field of Classification Search
None
See application file for complete search history.

(56) References Cited

U.S. PATENT DOCUMENTS

| 2006/0288371 | A1* | 12/2006 | Jun et al. .......................... 725/52 |
| 2007/0040843 | A1* | 2/2007 | Tsuchida ....................... 345/555 |
| 2009/0094587 | A1* | 4/2009 | Kawai ............................ 717/141 |
| 2012/0044059 | A1* | 2/2012 | Saros et al. ................... 340/10.5 |
| 2013/0072263 | A1* | 3/2013 | Kim ............................... 455/566 |

FOREIGN PATENT DOCUMENTS

JP    2012-070143    4/2012

* cited by examiner

*Primary Examiner* — H S Sough
*Assistant Examiner* — William C Wood
(74) *Attorney, Agent, or Firm* — Lexyoume IP Meister, PLLC

(57) ABSTRACT

A setup screen not interrupting a management system is displayed in a mobile terminal. A mobile terminal capable of being set up without interrupting a self-management function by detecting a call of a setup screen in a mobile terminal having the self-management function and displaying a virtual setup screen in which setup items interrupting the self-management function are excluded instead of the setup screen, a terminal setup method thereof, and a mobile terminal program thereof are provided.

8 Claims, 8 Drawing Sheets

FIG. 8

<LIST OF CLASS NAMES AND PARAMETERS OF SETUP SCREEN>

| TYPE | DETAILS |
|---|---|
| CLASS NAME | Application Killer Display |
| CLASS NAME | Network Select Display |
| PARAMETER (EXPLICIT) | Application Killer Display |
| PARAMETER (IMPLICIT) | Settings.ACTION_WIFI_SETTINGS |
| PARAMETER (IMPLICIT) | 21 |
| NAME SPACE | MobileXXOS.Settings |
| ⋮ | ⋮ |

MOBILE TERMINAL, METHOD AND PROGRAM FOR PROVIDING A VIRTUAL SETUP SCREEN

CROSS-REFERENCE TO RELATED APPLICATION

The present application claims priority to Japanese Patent Application No. 2012-280165 filed on Dec. 21, 2012, which is incorporated herein by reference as if reproduced in its entirety.

BACKGROUND OF THE INVENTION

The present invention relates to a mobile terminal capable of being set up without interrupting a self-management function, a terminal setup method thereof, and a mobile terminal program thereof.

With the recent propagation of high-performance mobile terminals such as a smartphone or a tablet PC, use of such high-performance mobile terminals is not limited to private purpose but is more and more broaden to corporations which provide their employees with such high-performance mobile terminals for use as information terminals. It is often necessary to prevent leakage of information when such mobile terminals are lost or to restrict physical takeout or non-business use of such mobile terminals, by means of terminal management systems such as a MDM (Mobile Device Management) system.

For example, there are needs for restricting the use of a lost or stolen terminal by restricting startup of the terminal through the use of remote control or permitting startup of the terminal only through the use of only remote control, or for preventing the private use of a specific terminal by restricting installation of applications except for registered applications in a white list.

However, most terminals generally have the setting authority for the installed applications. Accordingly, when an employee forcibly stops an application for managing a terminal, there is a problem in that it is difficult to effectively manage the terminal.

In view of this problem, means for restricting functions of a mobile terminal is suggested based on the user's understanding of the functions of the mobile terminal.

Japanese Patent Application Laid-open Publication No. 2012-70143 ("YASUTAKE") discloses a mobile terminal configured to present a question to a user, compare an input answer from the user with a stored answer in an authentication table to determine whether the both match, and unlock the restriction on the functions when the determination result satisfies predetermined criteria.

YASUTAKE provides a terminal configured to avoid undesirable performance of a function by confirming a user's correct understanding of the function before performing the function. Specifically, for example, when it is confirmed that a user understands that forcible stop or deletion of an application implementing a self-management function is inhibited, the stop or deletion of the application can be permitted. That is, it says that it is possible to prevent an employee from interrupting the self-management function by prescribing penalties for violation of internal regulations or the like.

However, YASUTAKE's terminal is able only to avoid an undesirable action on the basis of an employee's understanding. It can be said to be more effective that a mechanism for preventing occurrence of any undesirable action even when an employee performs any manipulation is basically necessary in consideration of takeout of a terminal.

Paying attention to an idea that a call of a setup screen can be detected by analyzing a call parameter of an application in a mobile terminal, the inventor thought that when a setup screen of a terminal is called, it is possible to detect the call of the setup screen and display a virtual setup screen in which setup items interrupting a self-management function is excluded instead of an original setup screen.

SUMMARY

The present invention is made in consideration of such a problem and an object thereof is to provide a mobile terminal capable of being set up without interrupting a self-management function by detecting a call of a setup screen of a terminal and displaying a virtual setup screen in which setup items interrupting the self-management function are excluded instead of an original setup screen, a terminal setup method thereof, and a mobile terminal program thereof.

The present invention provides the following solutions.

According to a first aspect of the present invention, there is provided a mobile terminal having a self-management function, including: application calling means for calling an application operating in the mobile terminal; setup screen call detecting means for detecting that a setup screen for setting up the mobile terminal is called by the application calling means; and virtual setup screen displaying means for displaying a virtual setup screen in which setup items interrupting the self-management function are excluded instead of the setup screen of which the calling is detected when the calling of the setup screen is detected.

According to the first aspect of the present invention, the mobile terminal having a self-management function calls an application which can operates in the mobile terminal, detects whether a setup screen for setting up the mobile terminal is called, and displays a virtual setup screen in which setup items interrupting the self-management function are excluded instead of the setup screen which is called.

The first aspect of the present invention relates to the mobile terminal, but the same operations and advantages can be achieved by a terminal setup method and a mobile terminal program.

A second aspect of the invention provides the mobile terminal according to the first aspect, wherein the application is prepared in an object-oriented language, the mobile terminal further includes class name acquiring means for acquiring a class name of the application called by the application calling means, and the setup screen call detecting means detects the calling of the setup screen by determining whether the class name acquired by the class name acquiring means is matched with one of one or more class names of the setup screen which are registered in advance.

According to the second aspect of the invention, the application is made in an object-oriented language and the mobile terminal according to the first aspect detects the calling of the setup screen by acquiring a class name constituting the application called by the application calling means and determining whether the acquired class name is matched with one of one or more class names of the setup screen registered in advance.

A third aspect of the present invention provides the mobile terminal according to the first aspect, wherein the application calling means performs an explicit calling operation of designating an application using a parameter and an implicit calling operation of not designating an application using a processing purpose as a parameter, the mobile terminal further includes call parameter acquiring means for acquiring a parameter when an application is called by the application calling means, and the setup screen call detecting means detects the calling of the setup screen by determining whether the parameter acquired by the call parameter acquiring means is matched with one of one or more parameters registered in advance and used to call the setup screen.

According to the third aspect of the present invention, the mobile terminal according to the first aspect performs an explicit calling operation of designating an application using a parameter or an implicit calling operation of designating an application using a processing purpose as a parameter, acquires the parameter when an application is called, and detects the calling of the setup screen by determining whether the acquired parameter is matched with one of one or more parameters registered in advance and used to call the setup screen.

According to a fourth aspect of the invention, there is provided a terminal setup method that is performed by a mobile terminal having a self-management function, including the steps of: calling an application operating in the mobile terminal; detecting that a setup screen for setting up the mobile terminal is called; and displaying a virtual setup screen in which setup items interrupting the self-management function are excluded instead of the setup screen of which the calling is detected when the calling of the setup screen is detected.

According to a fifth aspect of the invention, there is provided a mobile terminal program causing a mobile terminal having a self-management function to perform the steps of: calling an application operating in the mobile terminal; detecting that a setup screen for setting up the mobile terminal is called; and displaying a virtual setup screen in which setup items interrupting the self-management function are excluded instead of the setup screen which is called.

According to the aspects of the invention, it is possible to provide a mobile terminal capable of being set up without interrupting a self-management function by detecting a call of a setup screen in a mobile terminal having the self-management function and displaying a virtual setup screen in which setup items interrupting the self-management function are excluded instead of the called setup screen, a terminal setup method thereof, and a mobile terminal program thereof.

BRIEF DESCRIPTION OF DRAWINGS

FIG. 8 is a diagram illustrating an example of a list of class names and parameters which is stored in advance in a storage unit of a mobile terminal and which is used to call a setup screen.

DETAILED DESCRIPTION

Figure 1:
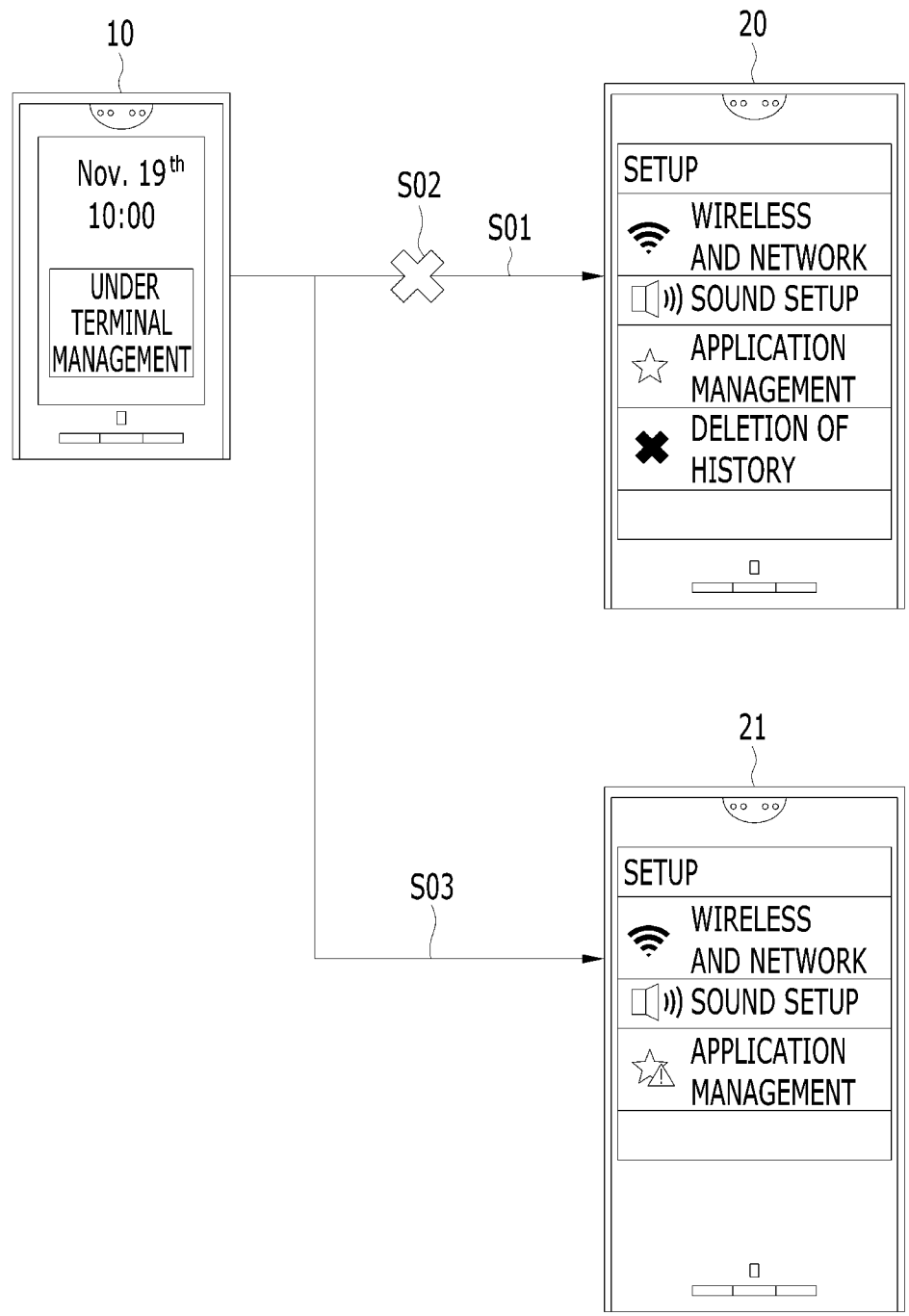
FIG. 1 is a diagram schematically illustrating a mobile terminal.

FIG. 1 is a diagram schematically illustrating a mobile terminal 10 according to an exemplary embodiment of the invention. A mobile terminal 10 will be schematically described with reference to FIG. 1.

The mobile terminal 10 includes various applications which are operable in a user terminal. In general, since one application in a mobile terminal controls one screen, calling of an application substantially means calling of an application screen controlled by the application.

The term "call/calling" means a command for transitioning to a state where an application is able to be used. The calling operation makes an application start up using a parameter when the application is inactive and put an application in an active state by giving a parameter to the application when the application is being executed in the background. Regarding the parameter, information itself on an application to be called as well as a parameter given to the application may serve as a parameter for the call.

Specifically, when a link to the URL of a store in a map application is displayed, it can be considered that a browser application is called using the URL as a parameter by tapping the link on the terminal. By this calling, the map application is transitioned to the browser application as an active application and the web page of the URL which is the parameter is displayed in the browser application. Here, the browser application is not necessarily under execution before the calling.

In the mobile terminal 10, plural types of browser applications may be usable. In this case, when an explicitly-specified application is designated using a parameter, the application is called. On the other hand, since it is difficult to predict that a specific application is usable in cooperation with another application at the time of design, an application may be implicitly called using only the purpose of "see a web page" as a parameter.

In FIG. 1, the self-management function is performed in the mobile terminal 10, and access to a network, storage of operation history, and addition and deletion of an application are restricted. For example, leakage of information to the outside can be prevented by inhibiting access to a wireless LAN other than the internal network, the time at which an operation serving as a reason of a problem is performed when the problem is caused, or non-business use can be restricted by preventing installation of an unnecessary application. In addition, when the terminal is lost or stolen, it is possible to prevent leakage of information in the terminal, for example, by setting up functions to request for authentication using the internal network when performing the functions.

However, in order to perform this self-management function, it is necessary to start up an application performing the function. When execution of the application is stopped by an employee, the self-management function is not performed.

On the other hand, when the setup function is extremely restricted, for example, by inhibiting the stop of an application under execution, the functions necessary for work cannot be used, and this is not reasonable. Therefore, when the calling of the setup screen 20 is detected, the mobile terminal 10 displays a virtual setup screen 21 in which items interrupting the self-management function are excluded from the setup screen 20 instead of displaying the setup screen 20.

That is, whenever the mobile terminal 10 calls an application, it is determined whether the call is a call of the setup screen 20, by comparing the call parameter or the class name of the application to be called with a list stored in advance in the storage unit. When the calling of the setup screen 20 is called (step S01), the calling is stopped (step S02).

The mobile terminal 10 displays a virtual setup screen 21 (step S03). The virtual setup screen 21 is a setup screen in which items interrupting the self-management function are excluded from the setup screen 20. In the virtual setup screen 21 shown in FIG. 1, the item "deletion of history" present in the original setup screen 20 is excluded and a restriction mark indicating a restricted function is displayed in "wireless and network" and "application management". On the other hand, since the sound setup function can be performed normally, a restriction mark is not displayed.

The virtual setup screen 21 may be designed in advance on the basis of the setup screen 20 and stored in the storage unit in the executable format, or may be dynamically processed and generated using the setup screen 20 as an input every time. In the latter, it is possible to cope with change in use of the setup screen due to update of an operating system without any correction.

The schematic configuration of the mobile terminal 10 has been described hitherto.

Description of Functions

Figure 2:
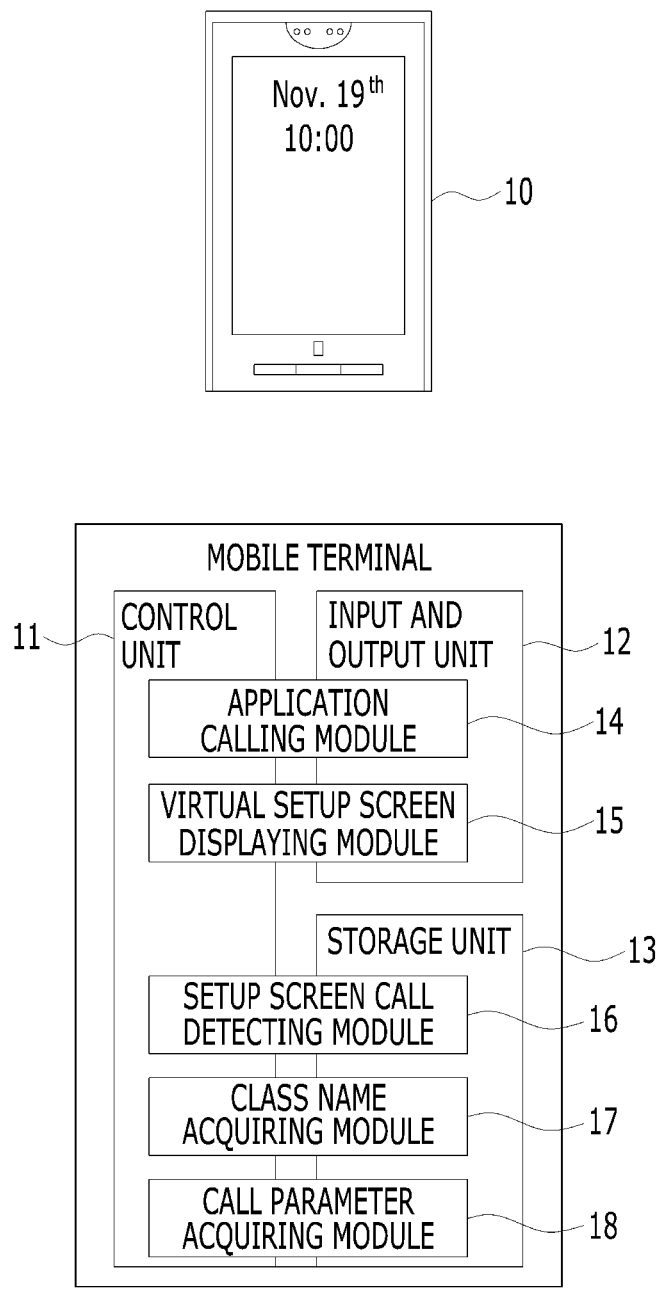
FIG. 2 is a diagram illustrating functional blocks of the mobile terminal and relations between the functional blocks.

FIG. 2 is a diagram illustrating functional blocks of the mobile terminal to and relations between the functional blocks.

The mobile terminal 10 is a household or business electronic product having data communication possible and is a product made on the premise of use during movement. Examples thereof include a mobile phone, a mobile information terminal, a laptop computer, a net book terminal, a slate terminal, an electronic book terminal, a portable music player, an audio component, a content reproduction/recording player, a portable printer, and a portable scanner. On the other hand, the mobile terminal 10 does not have to be a product at the first time made for portable use in both hardware and software, and may be a stationary product as long as an operating system made with a specification of a mobile terminal is mounted thereon.

The mobile terminal 10 includes a CPU (Central Processing Unit), a RAM (Random Access Memory), and a ROM (Read Only Memory) as a control unit 11, includes a display unit outputting or displaying data or images controlled by the control unit as an input and output unit 12, and includes a touch panel or a keypad receiving an input from a user or a resource administrator. The mobile terminal 10 includes a data storage unit such as a hard disk or a semiconductor memory as a storage unit 13.

In the mobile terminal 10, the control unit 11 realizes an application calling module 14 and a virtual setup screen displaying module 15 in cooperation with the input and output unit 12 by reading a predetermined program. In the mobile terminal 10, the control unit 11 realizes a setup screen call detecting module 16, a class name acquiring module 17, and a call parameter acquiring module 18 in cooperation with the storage unit 13 by reading a predetermined program.

Virtual Setup Screen Displaying Process

Figure 3:
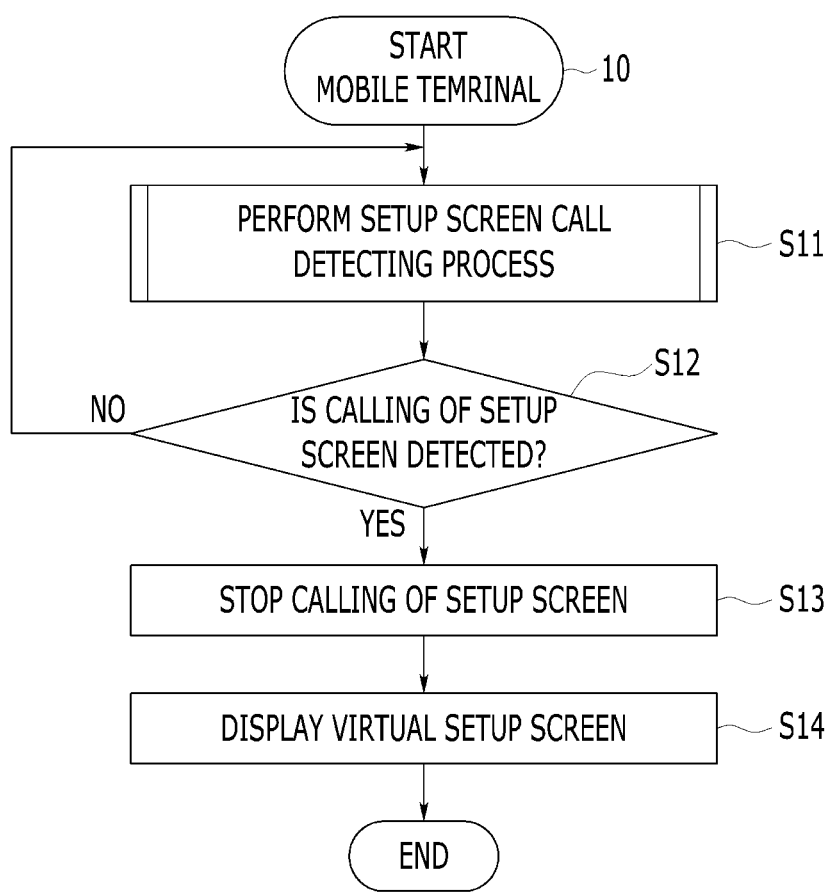
FIG. 3 is a flowchart illustrating the flow of a virtual setup screen displaying process which is performed by the mobile terminal.

FIG. 3 is a flowchart illustrating a virtual setup screen displaying process performed by the mobile terminal 10. The processes of the modules will be described below.

First, the mobile terminal lo performs a setup screen call detecting process to be described later (step S11). The setup screen call detecting process is a process of detecting calling of a setup screen. When the calling of the setup screen is not detected (NO in step S12), the process of step S11 is repeated until the calling of the setup screen is detected.

Setup Screen Call Detecting Process

Figure 4:
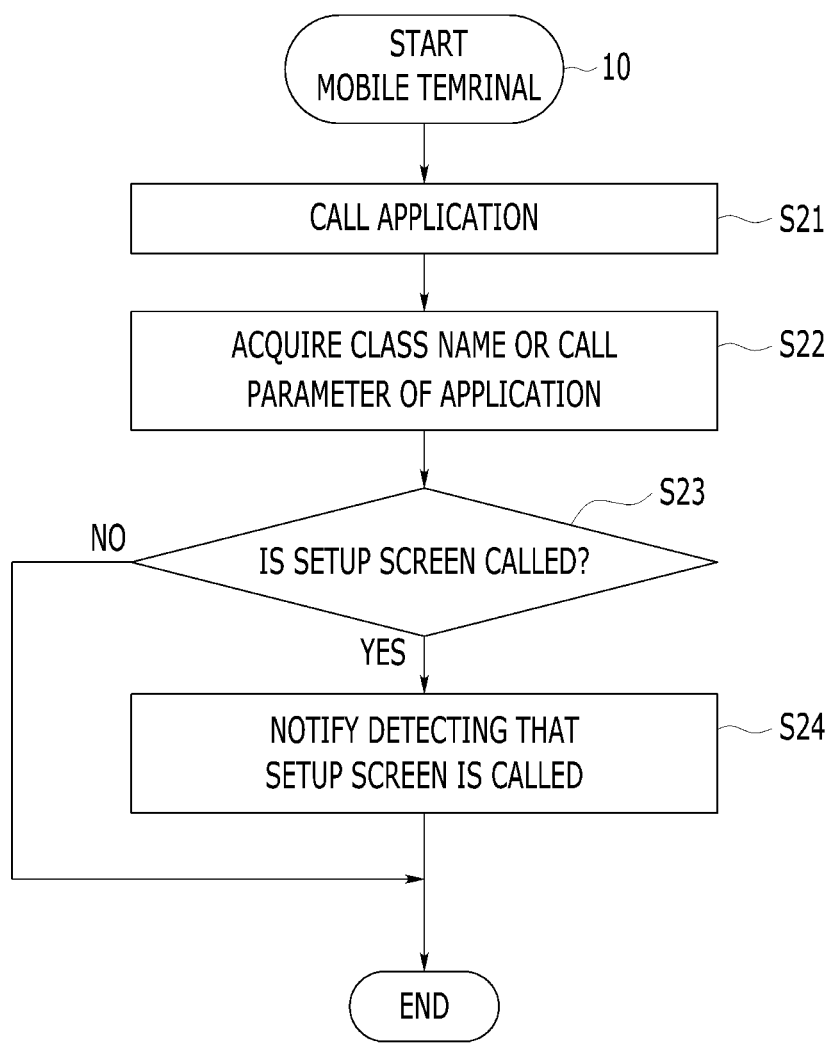
FIG. 4 is a flowchart illustrating the flow of a setup screen call detecting process which is performed by the mobile terminal.

FIG. 4 is a flowchart illustrating a setup screen call detecting process which is performed by the mobile terminal 10. The processes of the modules will be described below.

In the setup screen call detecting process, first, the application calling module 14 calls an application (step S21). As described above, the calling of an application means a command for transitioning to a state when the application is able to be used. The calling accompanies a parameter, and examples of the parameter include information of an application to be called and a parameter given to the application.

Then, the class name acquiring module 17 or the call parameter acquiring module 18 acquires a class name or a call parameter of the called application (step S22). When the application is not prepared in an object-oriented language or the like and the class name is not acquired, the call parameter is acquired. Here, when the calling is an explicit calling operation, the parameter itself may be class name.

The class name or the call parameter is preferably acquired before the calling is ended, but the class name may be acquired by acquiring a class name of an object once developed on the memory depending on the specification of the mobile terminal. In this case, the calling of the setup screen can be stopped by cancelling the object or releasing reference to the screen.

Here, the acquiring of the class name preferably includes acquiring of a name space, but when the name space is not acquired, only the class name may be acquired. In this case, a possible name space may be extracted from a library stored in the storage unit using the acquired class name. The same is true that the acquired parameter is a class name.

Then, the setup screen call detecting module 16 determines whether the acquired class name or parameter is matched with a class name or parameter used to call a setup screen stored in advance in the storage unit, and determines whether the setup screen is called on the basis of the determination result (step S23). When both are not matched (NO in step S23), the calling of the setup screen is not detected and the setup screen call detecting process is ended. On the contrary, when both are matched (YES in step S23), it is determined that the calling of the setup screen is detected, a return value indicating that the calling of the setup screen is detected is returned, and the setup screen call detecting process is ended (step S24).

FIG. 8 is a diagram illustrating an example of a list of class names and parameters used to call the setup screen. In FIG. 8, the type includes a class name, a parameter, and a name space, and the parameter includes an explicit call and an implicit call.

When a class name is acquired in step S22 and a class name is consequently acquired as an explicit call parameter, the class name is compared using the list shown in FIG. 8. When the class name is not present in the list shown in FIG. 8, it is determined in step S23 that the calling of the setup screen is not detected. On the other hand, when a class name "ApplicationKillerDisplay" or the like which is a forcible ending screen of an application is acquired, the class name is present in the list and thus it is detected that the setup screen is called.

The same is true of the parameter. When a parameter is stored in the form of definition of a fixed number in a class such as "Settings.ACTION_WIFI_SETTINGS", the determination may be performed by reading the class similarly. For example, when the parameter is simply a numerical value such as "21", the determination may be performed by comparing byte sequences or values directly indicated thereby. When the name space is acquired or extracted, the determination may be performed on the basis of the name space.

The flow of the setup screen call detecting process has been described hitherto. Returning to the virtual setup screen displaying process, it is determined whether the calling of the setup screen is detected on the basis of the return value in the setup screen call detecting process (step S12). When the calling of the setup screen is not detected (NO in step S12), the setup screen call detecting process is repeated until the calling of the setup screen is detected. When it is determined that the calling of the setup screen is detected (YES in step S12), the following process will be performed subsequently.

Then, the virtual setup screen displaying module 15 stops the calling of the setup screen (step S13). Regarding the stopping, the setup screen may be deactivated, the generated object may be cancelled, or the corresponding process may be ended before generating the object.

Finally, the virtual setup screen displaying module 15 displays the virtual setup screen instead of the setup screen of which the calling is stopped (step S14). The virtual setup screen is obtained by excluding items interrupting the self-management function from the setup screen. The virtual setup screen may be stored in advance in the storage unit, similarly to the setup screen, or may be dynamically generated on the basis of objects of the setup screen generated by a call. The setup function performed in the virtual setup screen may be performed by the virtual setup screen object or only the process portion may be performed by the setup screen object.

Figure 5:
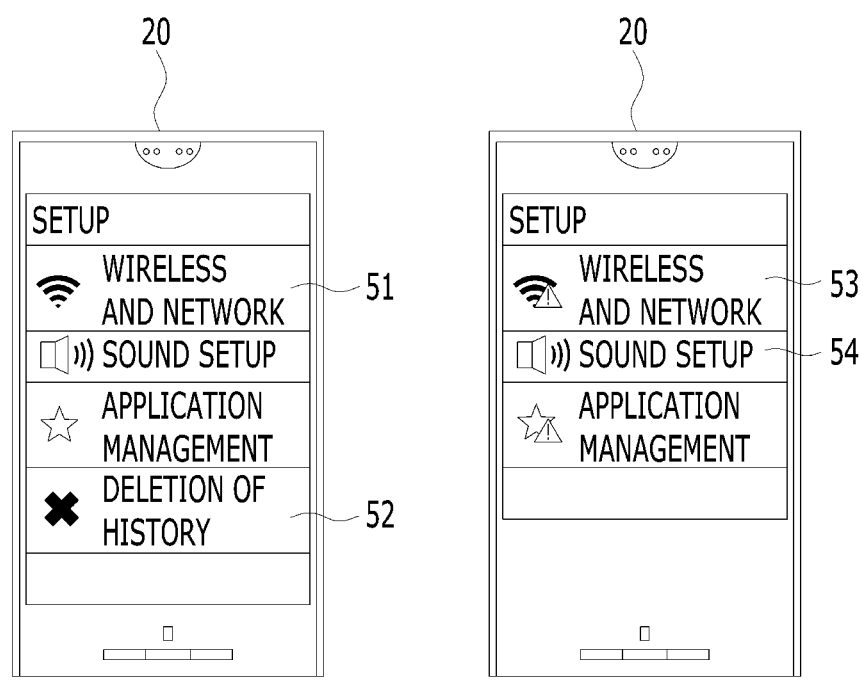
FIG. 5 is a diagram illustrating a comparison example of a called setup screen and a displayed virtual setup screen.

A specific example of a process flow using the setup screen 20 and the virtual setup screen 21 will be described. FIG. 5 shows a comparison example of the setup screen 20 and the virtual setup screen 21. In the setup screen 20, setup items 51 are vertically arranged, and a detailed setup screen is opened as a sub item by touching each setup item. This opening is also a switch of a screen and may be displayed as a call of an application.

On the other hand, in the virtual setup screen 21, a menu "deletion of history" 52 interrupting the self-management function is excluded and a restriction mark 23 is displayed in the menus "wireless and network" and "application management". This represents that since no sub item is displayed in the menu "deletion of history", the menu "deletion of history" is excluded as a main item from the virtual setup screen 21. The restriction mark 53 represent that there are a sub item displayed and a sub item not displayed when the corresponding menu is selected and the functions are partially restricted. A menu "sound setup" 54 of which the function is not restricted is displayed without any change.

Figure 6:
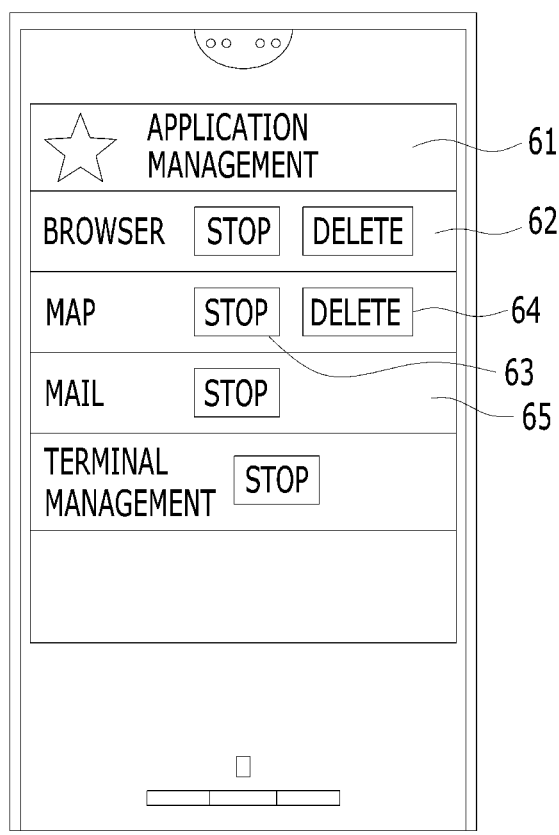
FIG. 6 is a diagram illustrating an example of an application management screen to which a setup screen transitions and which is not functionally restricted.

FIG. 6 shows an example of an application management screen having a function not restricted, which is switched from the setup screen 20. A series of applications 62 are arranged under the item name 61, and application names, a stop button 63, and a delete button 64 are displayed therein. A user can forcibly stop an application under execution by touching the stop button 63, and can delete the application from the mobile terminal 10 by touching the delete button 64. There is also an application such as a mail application 65 of which the deletion is not systematically permitted.

Figure 7:
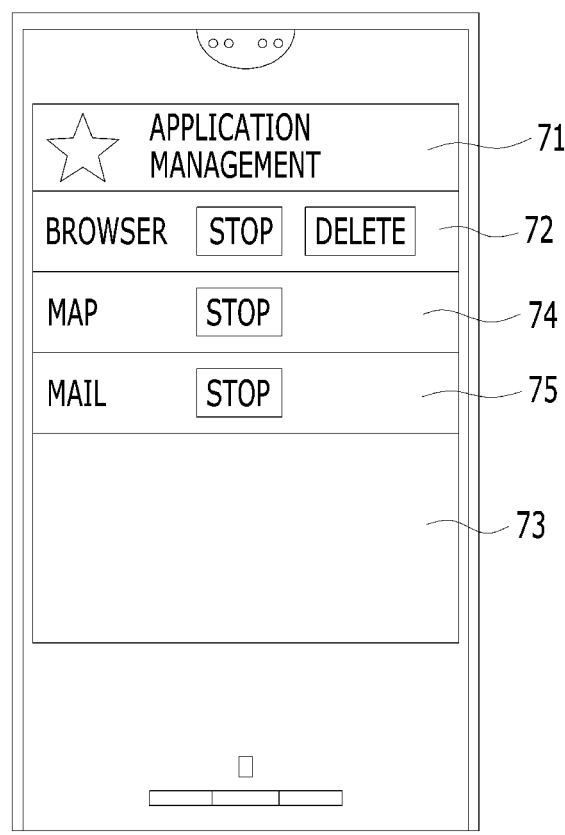
FIG. 7 is a diagram illustrating an example of an application management screen to which a virtual setup screen transitions and which is functionally restricted.

FIG. 7 shows an example of an application management screen having a function restricted, which is switched from the virtual setup screen 21. The configuration of item names 71 and a series of applications 72 is the same shown in FIG. 6, but a stop button 73 of the terminal management application shown in FIG. 6 is blank. Accordingly, a user can neither stop nor delete the terminal management application from the virtual setup screen.

The flow of the virtual setup screen displaying process has been described hitherto.

The above-mentioned means and functions are realized by causing a computer (including a CPU, an information processing apparatus, or various terminals) to read and execute a predetermined program. The program can be provided in a state where the program is recorded on a computer-readable recording medium such as a flexible disk, a CD (such as a CD-ROM), and a DVD (such as a DVD-RAM). In this case, the computer reads the program from the recording medium, transmits the program to an internal storage unit or an external storage unit, and stores and executes the program therein. The program may be recorded in advance on a storage unit (recording medium) such as a magnetic disk, an optical disk, and a magneto-optical disk and may be provided to the computer via a communication line from the storage unit.

While the embodiments of the invention have been described, the invention is not limited to the embodiments. The advantages described in the embodiments of the invention are only exemplary advantages of the invention, and the advantages of the invention are not limited to the description in the embodiments of the invention.

What is claimed is:

1. A mobile terminal having a self-management function, comprising:
    a display unit; and
    a controller configured to execute one or more modules including:
        an application calling module for calling an application operating in the mobile terminal;
        a setup screen call detecting module for detecting that a setup screen for setting up the mobile terminal is called by the application calling module, the setup screen including a plurality of setup items and the plurality of setup items including setup items interrupting the self-management function; and
        a virtual setup screen displaying module for displaying on the display unit a virtual setup screen instead of the setup screen of which the calling is detected when the calling of the setup screen is detected, the virtual setup screen including setup items in which at least the setup items interrupting the self-management function are excluded from the plurality of setup items included in the setup screen.

2. The mobile terminal according to claim 1, wherein the application is made in an object-oriented language,
    wherein the one or more modules further include a class name acquiring module for acquiring a class name of the application called by the application calling module, and
    wherein the setup screen call detecting module detects the calling of the setup screen by determining whether the class name acquired by the class name acquiring module is matched with one of one or more class names of the setup screen which are registered in advance.

3. The mobile terminal according to claim 1, wherein the application calling module performs an explicit calling operation of designating an application using a parameter or an implicit calling operation of designating an application using a processing purpose as a parameter,
    wherein the one or more modules further include a call parameter acquiring module for acquiring a parameter when an application is called by the application calling module, and wherein the setup screen call detecting module detects the calling of the setup screen by determining whether the parameter acquired by the call parameter acquiring module is matched with one of one or more parameters registered in advance and used to call the setup screen.

4. The mobile terminal according to claim 1, wherein the setup items interrupting the self-management function includes a setup item for deleting or forcibly stopping a predetermined application.

5. A terminal setup method that is performed by a mobile terminal having a self-management function, comprising the steps of:
- calling an application operating in the mobile terminal;
- detecting that a setup screen for setting up the mobile terminal is called, the setup screen including a plurality of setup items and the plurality of setup items including setup items interrupting the self-management function; and
- displaying a virtual setup screen instead of the setup screen of which the calling is detected when the calling of the setup screen is detected, the virtual setup screen including setup items in which at least the setup items interrupting the self-management function are excluded from the plurality of setup items included in the setup screen.

6. The terminal setup method according to claim 5, wherein the setup items interrupting the self-management function includes a setup item for deleting or forcibly stopping a predetermined application.

7. A non-transitory computer-readable recording medium that store a mobile terminal program causing a mobile terminal having a self-management function to perform a method comprising:
- calling an application operating in the mobile terminal;
- detecting that a setup screen for setting up the mobile terminal is called, the setup screen including a plurality of setup items and the plurality of setup items including setup items interrupting the self-management function; and
- displaying a virtual setup screen instead of the setup screen of which the calling is detected when the calling of the setup screen is detected, the virtual setup screen including setup items in which at least the setup items interrupting the self-management function are excluded from the plurality of setup items included in the setup screen.

8. The non-transitory computer-readable recording medium according to claim 7, wherein the setup items interrupting the self-management function includes a setup item for deleting or forcibly stopping a predetermined application.

* * * * *